(12) United States Patent
Kwong et al.

(10) Patent No.: US 7,633,908 B1
(45) Date of Patent: Dec. 15, 2009

(54) MOBILE AD HOC NETWORK

(75) Inventors: Herman Kwong, Kanata (CA); Robert Hadaway, Dunrobin (CA); Thomas Chmara, Richmond (CA); Jodee Varney, Lincoln, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 896 days.

(21) Appl. No.: 11/236,130

(22) Filed: Sep. 27, 2005

(51) Int. Cl.
*H04B 7/212* (2006.01)
(52) U.S. Cl. .............. 370/337; 455/462; 455/11.1; 455/15
(58) Field of Classification Search .......... 370/337; 455/11.1, 462, 15
See application file for complete search history.

(56) References Cited

U.S. PATENT DOCUMENTS

| | | | |
|---|---|---|---|
| 2002/0115455 A1* | 8/2002 | Umstetter et al. | 455/462 |
| 2003/0134598 A1* | 7/2003 | Sendrowicz | 455/67.1 |
| 2003/0177219 A1* | 9/2003 | Taib et al. | 709/223 |
| 2003/0220074 A1* | 11/2003 | Wee et al. | 455/11.1 |
| 2005/0181724 A1* | 8/2005 | Morino | 455/15 |
| 2006/0046645 A1* | 3/2006 | Ogilvie | 455/11.1 |

\* cited by examiner

*Primary Examiner*—David Q Nguyen
(74) *Attorney, Agent, or Firm*—Anderson Gorecki & Manaras LLP

(57) ABSTRACT

A mobile ad hoc network is formed by selecting at least one client to function as a Virtual Mobile Server ("VMS") on behalf of other clients: Those other clients subsequently communicate with a cell station via the VMS on an UWB format. Other clients may function as Virtual Distributed Mobile Servers ("VDMSs") which relay communications between the VMS and clients which are out of direct communication range of the VMS. Further, multiple VMSs may be implemented for a single ad hoc network in order to bundle bandwidth. Clients may also extend the communication range of the VMS to a new cell station in order to enable earlier initiation of cell station handoff.

20 Claims, 4 Drawing Sheets

MOBILE AD HOC NETWORK

FIELD OF THE INVENTION

This invention relates generally to the field of network communications, and more particularly to wireless networks.

BACKGROUND OF THE INVENTION

Wireless communications technology continues to increase in popularity at least in-part because of the convenience of using mobile client devices such as a cell phones. Rather than being limited to the range of a wire, the mobile client provides communications wherever the user travels if a fixed access device such as a cell tower is within range. However, wireless communications networks have some shortcomings in comparison with wired networks. For example, the bandwidth available per subscriber on wireless networks is typically less than that of wired networks. Perhaps the main reason for this limitation is that the assigned spectrum on which wireless communications can be supported is more limited. Whereas wired bandwidth may be increased by adding optical fiber to the network, and optical wavelengths can be reused on adjacent fibers, wireless service providers are limited to the spectrum licensed to them by the government. This problem is exacerbated by the desire of both service providers and subscribers to utilize broadband wireless services such as real-time road traffic update and rerouting services during rush hour, and the resulting formation of transient wireless "hot spots." Moreover, clients that are in motion, e.g., in automobiles, receive relatively less benefit from concentrations of network resources that support static "hot spots." Clients in motion may also suffer data rate drop due to Doppler effects, with frequency increasing when the fixed station and client approach each other and decreasing when they move apart. It would therefore be desirable to facilitate higher-bandwidth services using mobile-mounted equipment.

SUMMARY OF THE INVENTION

In accordance with the invention, a wireless mobile device for supporting an ad hoc network comprises mobile server functions including: logic operable to optionally communicate with a fixed station via a first wireless communication link; logic operable to communicate with a wireless mobile client via a second wireless communication link, where the first wireless communication link and the second wireless communication link are non-interfering; and logic operable to translate between a first wireless communication link format and a second wireless communication link format, whereby the mobile client can communicate with the fixed base station via the mobile device.

In accordance with a method of the invention, supporting an ad hoc network with wireless mobile device comprises the steps of: selectively executing mobile server functions including the steps of: optionally communicating with a fixed station via a first wireless communication link; communicating with a wireless mobile client via a second wireless communication link, where the first wireless communication link and the second wireless communication link are non-interfering; and translating between a first wireless communication link format and a second wireless communication link format, whereby the mobile client can communicate with the fixed base station via the mobile device.

One advantage of the invention is increased usable bandwidth per subscriber. For example, the bandwidth available to a client is increased by bundling sessions with one or more cell stations, or aggregating and balancing capacity across multiple clients where each may enjoy different signal qualities and strengths at any given time. Further, communications traffic which is common among the clients can be transmitted once rather than N times. Still further, a some cellular access bandwidth is employed for overhead such as call setup, teardown and communications link maintenance protocols. The invention may mitigate the amount of bandwidth required for overhead by aggregating traffic from multiple clients into a single cellular session. Hence, an overhead reduction of up to N:1 can be realized where N clients are aggregated onto the cellular session.

Another advantage of the invention is enhanced handoff. The protocols typically used to associate a client with a cell station can be relatively time-consuming. While this might be acceptable for a single client moving between cells, any interruption of service between a wireless mobile device in accordance with the invention and a cell tower would tend to affect multiple clients. In order to provide more time in which to execute the handoff protocol, the wireless mobile device may begin executing the handoff protocol with a new cell station via a client of the wireless mobile device. Consequently, handoff protocol execution may begin before the wireless mobile device is within range of the cell station.

DETAILED DESCRIPTION

Figure 1:
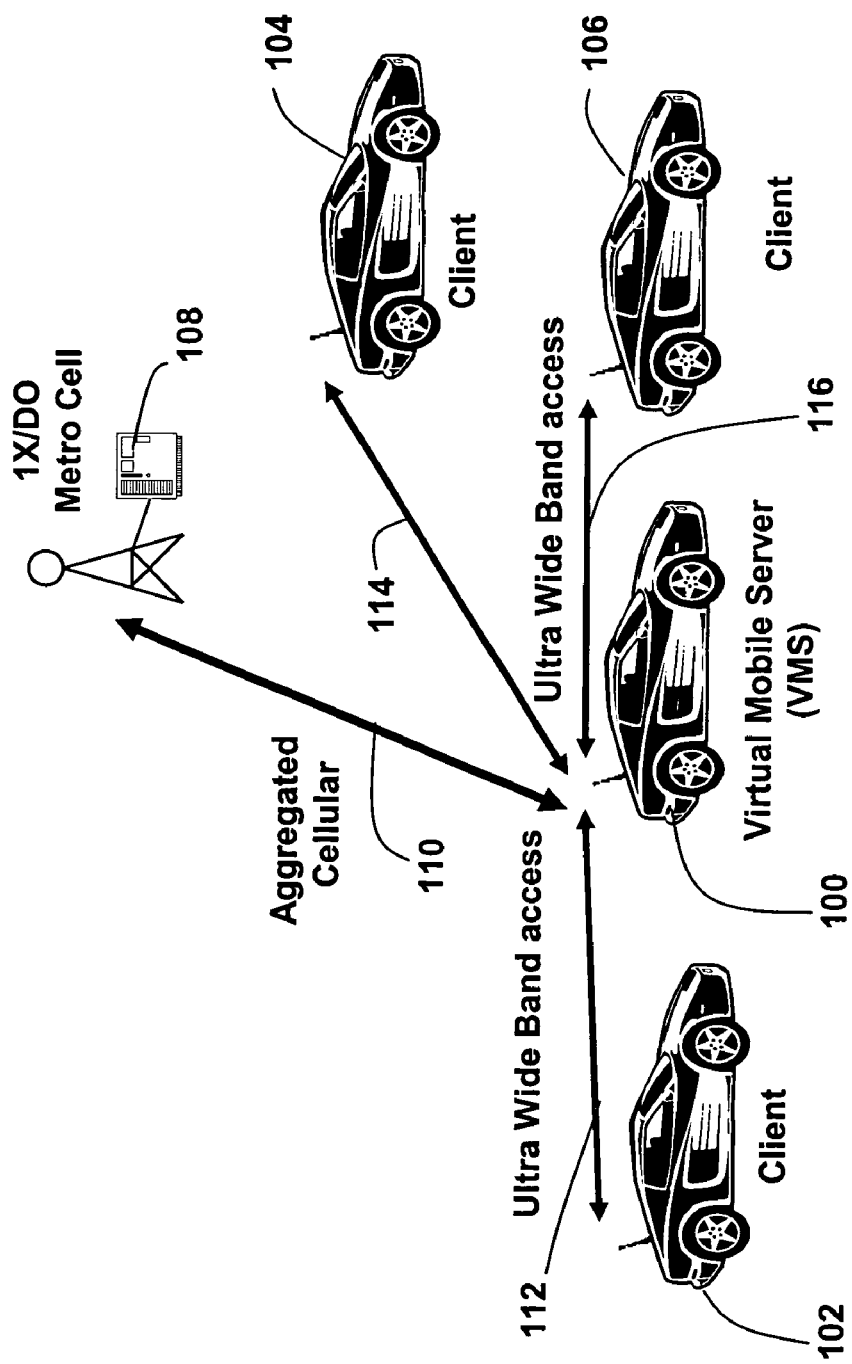
FIG. 1 illustrates use of a Virtual Mobile Server to aggregate access for clients.

Referring to FIG. 1, a Virtual Mobile Server ("VMS") (100) facilitates wireless access between subscriber devices ("clients") (102, 104, 106) and a cell station (108). In particular, the VMS (100) is operable to aggregate traffic from the clients onto a single session on an aggregated cellular access link (110) between the VMS and the cell station. The VMS (100) is further operable to relay traffic from the cell station to the clients. In the illustrated embodiment the clients and VMS are implemented in automobiles. While this is not the only possible embodiment, an automobile offers the potential advantage of availability of a relatively constant high power supply.

The communications link (110) between the VMS and cell station is non-interfering relative to the respective links (112, 114, 116) between the VMS and the clients. In the illustrated embodiment the communications link (110) between the VMS and the cell station utilizes in a current embodiment standard cellular protocols and spectrum, but it will be understood that this may evolve to be a different technology where a preferred embodiment includes WiMAX. In contrast, the communications links (112, 114, 116) between the VMS and the clients utilize one or more other communications technologies, with a preferred embodiment being Ultra Wide Band ("UWB") protocols and spectrum. Hence, depending on implementation details such as antenna requirements and computational capability, the VMS may be capable of simultaneous communications with the cell station and clients.

At least some clients are indirectly supported by the cell station. For example, the session between the VMS and cell station may include traffic from all of the clients, including the VMS itself. The traffic associated with the other clients (102, 104, 106) can be transparent to the cell station because the VMS translates the traffic from the UWB format to the cellular format and aggregates the traffic into a single communication session with the cell station. Suitable techniques are employed to maintain client/traffic separation of the aggregated traffic. Traffic bound for the clients is transmitted from the cell station to the VMS, translated by the VMS from cellular format to UWB format, and rebroadcast by the VMS. The clients are indirectly supported by the cell station because all communications are made via the VMS.

Indirect support of clients via the VMS can enable bundling of traffic and resources for the clients that utilize the VMS. For example, if one or more of the clients subscribe to a particular service then the messages associated with that service can be synchronized and broadcast/multicast by the VMS on behalf of the cell station. In other words, the cell station could transmit a particular service packet once for M clients, relying on the VMS to either broadcast the packet to the clients or transmit M copies of the packet to the clients on a point-to-point basis. If the VMS is able to utilize more than the bandwidth of a single cellular access link, e.g., N*cellular access link bandwidth where N=number of clients+1 (for the VMS), then a shared bandwidth pool is created. One possible advantage of a bandwidth pool is enhanced ability to accommodate bursty traffic, although overall bandwidth per subscriber might be unchanged or even decrease.

In one embodiment the VMS (100) is a transient function performed by one of the clients of the ad hoc network. A plurality of clients initially compete to become the VMS. One of the clients is selected based on factors such as relative signal strength, position and motion within the pool of clients. A selection beacon is then transmitted from either the cell station or the selected VMS to indicate that the selection has been made. In response to the selection beacon the other clients may cease communications via the cellular access link and associate with the VMS via UWB. When the selected VMS is no longer capable of, or desirable for, the VMS function, it is de-selected and again becomes a client. In particular, the de-selected VMS may cease communications via the cellular access link and associates with a VMS via UWB. If no VMS is within range of a client then the client may revert to communications via a cellular access link.

Figure 2:
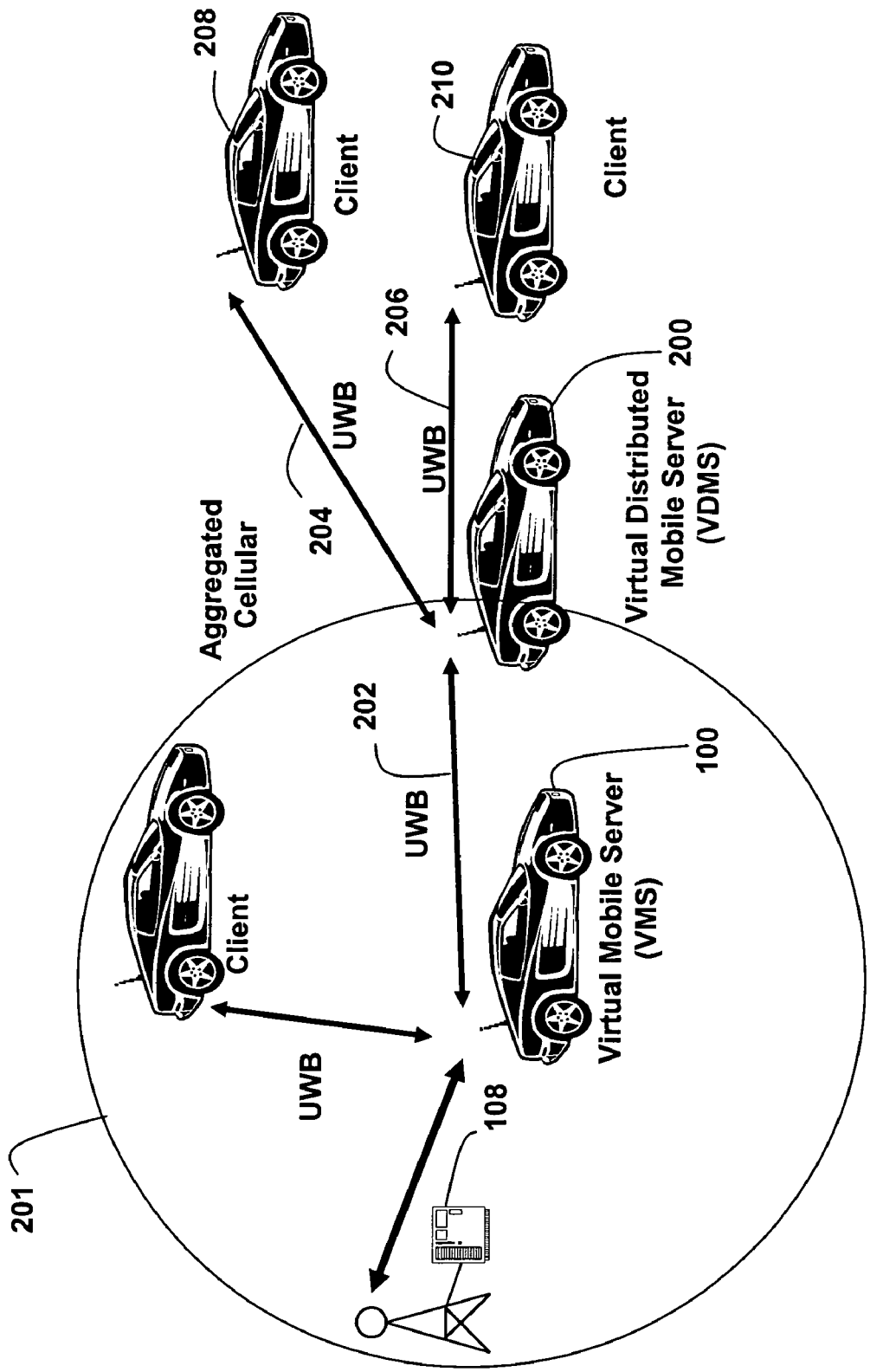
FIG. 2 illustrates a Virtual Distributed Mobile Server that extends the range of the Virtual Mobile Server.

Referring now to FIG. 2, a Virtual Distributed Mobile Server ("VDMS")(200) can be employed to extend the range (201) of the VMS (100) via hierarchical UWB links (202, 204, 206). In particular, the VDMS (200) relays communications traffic between the VMS (100) and clients (208, 210). Unlike the VMS, the VDMS need not perform translation of the traffic but rather relays the traffic between the VMS and clients in UWB format.

The VDMS (200) may be a transient function performed by one of the clients. In particular, a client may unilaterally opt to become VDMS upon detection of an outlying client, e.g., client (208), that is out of communication range of the VMS (100). As discussed above, an outlying client may revert to direct cellular communication with the cell station (108) if no VMS is within range. Such communications can be detected by clients within range of the VMS. These clients may then exchange communications to determine which is capable of providing the most favorable data rate between the VMS (100) and outlying client (208). The selected client then becomes a VDMS and advertises the selection with a beacon signal. In response to the beacon signal the outlying client associates with the VDMS (200) and ceases direct cellular communications with the cell station (108). When the selected VDMS is no longer capable of, or desirable for, the VDMS function, it is de-selected and again becomes a client. In particular, the de-selected VDMS ceases advertising itself with a UWB beacon and ceases relaying traffic for clients.

Figure 3:
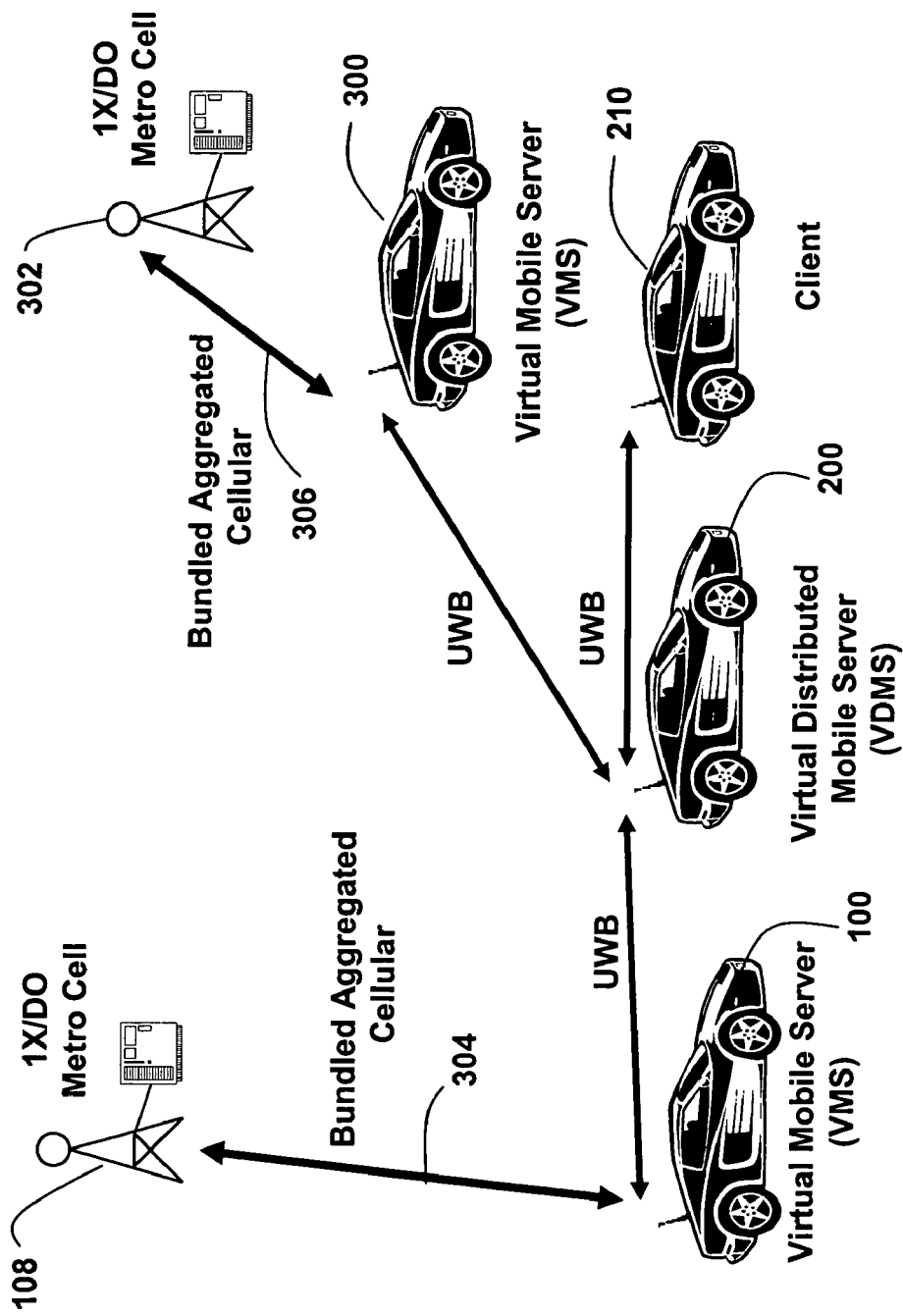
FIG. 3 illustrates bundling of aggregated cellular access with multiple cellular towers.

Referring now to FIG. 3, multiple VMSs (100, 300) may coordinate in order to support common clients via bundled, aggregated cellular links (304, 306). In particular, using multiple VMSs, it is possible to aggregate capacity across nodes which may enjoy different signal strengths and qualities. The coordinated VMSs may be supported by one or more cell stations. If each VMS is limited to the bandwidth of a single cellular access link then overall bandwidth will be increased even if all of the coordinated VMSs are in the same cell because: given 1 VMS in a sector with 10 subscribers, the ad-hoc network will have $\frac{1}{10}$th of the sector capacity; given 2 VMSs in this same sector, all else being equal, the ad-hoc network will enjoy $\frac{2}{10}$ths of the sector capacity. However, if each VMS is capable of utilizing more bandwidth than a single cellular access link via coordination with the cell station then it may be desirable to limit the number of VMS of a given ad hoc network that are supported by a given cell station.

Referring now to FIGS. 2 and 3, the additional VMS (300) in the ad hoc network may be selected based on a competition model as discussed with respect to the selection of the initial VMS. However, the competition may only be triggered upon detection of a new cell station (302). Once the new cell station is detected, each of the clients within range of that new cell station may compete to become VMS based on signal strength, motion and location as described above. For example, client (208 FIG. 2) can become VMS (300 FIG. 3). When the selected additional VMS is no longer capable of, or desirable for, the VMS function, it is de-selected and again becomes a client. In particular, the de-selected VMS ceases advertising itself with a UWB beacon. Routing protocols and load balancing techniques may be employed to make use of the parallel communications paths offered when multiple VMSs are active within the ad hoc network. For example, the existence of a VDMS (200) in the ad hoc network may result in a different number of hops between a particular client (210) and each VMS (100, 300). It may therefore be favorable to utilize the closer VMS in terms of number of hops. Alternatively, the further VMS in terms of hops may be capable of providing greater bandwidth as a result of supporting fewer clients. Routing and load balancing techniques which are generally known in connection with wired networks may be adapted to support the ad hoc network. Those skilled in the art will recognize that use of multiple VMSs creates a pool of shared bandwidth. One result of creating a pool of shared bandwidth is that the bandwidth available at a given point in time is increased even though the overall per-client bandwidth is unchanged or even decreased. Consequently, the cell or client may be able to burst transmit at a rate greater than that available via a single cellular access link.

Figure 4:
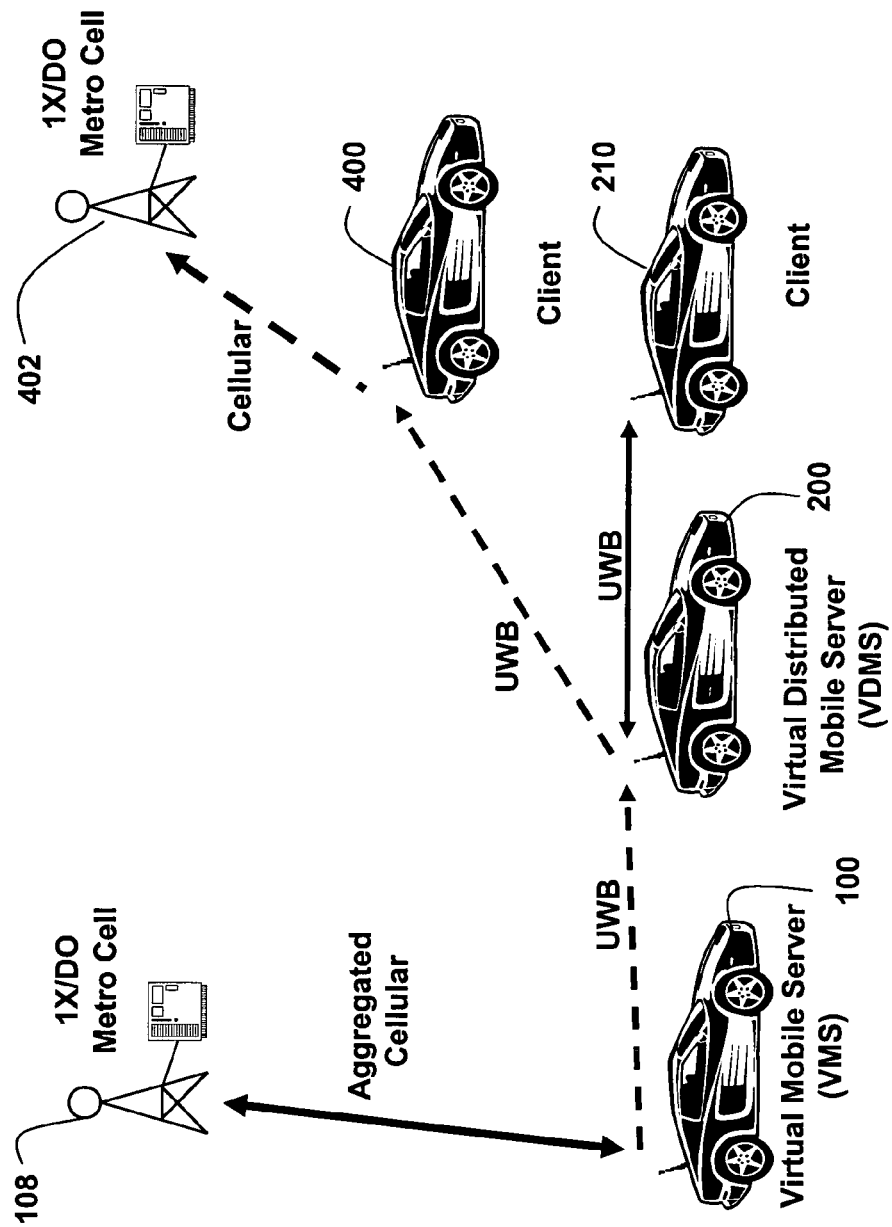
FIG. 4 illustrates VMS handoff between cell stations.

Referring now to FIG. 4, a member of the ad hoc network, such as a client (400), VDMS (200) or an additional VMS, can be used to facilitate handoff between cells. Because the ad hoc network can be both geographically spread out and in motion, there will commonly be a need to handoff between cell stations. The first member of the ad hoc network to detect a new cell station (402), i.e., to move within range of the new cell station, is operable to alert the VMS. In the illustrated example, client (208) alerts VMS (100) of detection of cell station (402). The VMS (100) may then establish communication with the new cell station (402) via clients and VDMS in order to execute preliminary steps for associating with the new cell station.

The propagation of communications to clients and VDMSs may be transparent to the new cell station (402). In particular, from the perspective of the new cell station the communications may be observed as being directly to and from the VMS (100), although suitable techniques are employed for maintaining client/traffic separation of the aggregated traffic as mentioned above. The client (400) in direct communication with the new cell station is operable to translate the communications between UWB format and cellular format, thereby acting as a proxy for the VMS. Intermediary clients and VDMSs, i.e., those between the client (400) and the VMS (100), simply function as relays for the communications in UWB format. One advantage of this technique is that the overlap between cell stations is effectively increased, and the likelihood of interruptions during handoff between cell stations is reduced.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A wireless mobile device for supporting an ad hoc network comprising:
    mobile server functions which enable the mobile device to aggregate traffic from a plurality of mobile clients including:
        logic which communicates with a fixed station via a first wireless communication link;
        logic which communicates with a wireless mobile client via a second wireless communication link, where the first wireless communication link and the second wireless communication link are non-interfering, the first wireless communication link is characterized by greater bandwidth than the second wireless communication link, and wherein the wireless mobile client does not communicate with the fixed station other than via the mobile device; and
        logic which translates between a first wireless communication link format and a second wireless communication link format,
    whereby the mobile client can communicate with the fixed base station via the mobile device.

2. The wireless mobile device of claim 1 further including logic operable to utilize a plurality of communication links with at least one fixed base station in support of communication with the mobile client.

3. The wireless mobile device of claim 1 further including logic operable to initiate execution of mobile server functions by a wireless mobile client selected from a group wireless mobile clients.

4. The wireless mobile device of claim 3 further including logic operable to terminate execution of the mobile server functions in response to a de-selection signal.

5. The wireless mobile device of claim 3 further including logic operable to broadcast a beacon signal via the second wireless communication link format in order to advertise the selected wireless mobile server functions to wireless mobile clients, wherein those clients are operable in response to the beacon to associate with the wireless mobile device and terminate communications via the first wireless communication link format.

6. The wireless mobile device of claim 1 further comprising distributed mobile server functions including:
    logic operable to relay communications between a wireless mobile client and a wireless mobile server via first and second wireless communication links of the second format, thereby extending the range of the wireless mobile server.

7. The wireless mobile device of claim 6 further including logic operable to initiate execution of the distributed mobile server functions by a wireless mobile client in response to detection of a wireless mobile client communicating directly with the fixed base station via the first wireless communication link format.

8. The wireless mobile device of claim 7 further including logic operable to broadcast a beacon signal via the second wireless communication link format in order to advertise the distributed wireless mobile server functions to the wireless mobile client utilizing the first wireless communication link format, wherein that client is operable in response to the beacon to associate with the wireless mobile device and terminate communications via the first wireless communication link format.

9. The wireless mobile device of claim 1 further including logic for coordinating with a second wireless mobile server, whereby the mobile client can communicate with fixed base stations via parallel paths.

10. The wireless mobile device of claim 1 further including logic operable to initiate handoff to a second fixed base station with communications via the mobile client, whereby the device can initiate handoff before being within direct communication range of the second fixed base station.

11. A method for supporting an ad hoc network with wireless mobile device comprising the steps of:
    selectively executing mobile server functions which enable the mobile device to aggregate traffic from a plurality of mobile clients, the functions including the steps of:
        communicating with a fixed station via a first wireless communication link;
        communicating with a wireless mobile client via a second wireless communication link, where the first wireless communication link and the second wireless communication link are non-interfering, the first wireless communication link is characterized by greater bandwidth than the second wireless communication link, and wherein the wireless mobile client does not communicate with the fixed station other than via the mobile device; and
        translating between a first wireless communication link format and a second wireless communication link format,
    whereby the mobile client can communicate with the fixed base station via the mobile device.

12. The method of claim 11 further including the step of utilizing a plurality of communication links with at least one fixed base station in support of communication with the mobile client.

13. The method of claim 11 further including the step of initiating execution of mobile server functions by a wireless mobile client selected from a group wireless mobile clients.

14. The method of claim 13 further including the step of terminating execution of the mobile server functions in response to a de-selection signal.

15. The method of claim 13 further including the step of broadcasting a beacon signal via the second wireless communication link format in order to advertise the selected wireless mobile server functions to wireless mobile clients, wherein those clients are operable in response to the beacon to associate with the wireless mobile device and terminate communications via the first wireless communication link format.

16. The method of claim 11 further comprising distributed mobile server functions including the step of:

relaying communications between a wireless mobile client and a wireless mobile server via first and second wireless communication links of the second format, thereby extending the range of the wireless mobile server.

17. The method of claim 16 further including the step of initiating execution of the distributed mobile server functions by a wireless mobile client in response to detection of a wireless mobile client communicating directly with the fixed base station via the first wireless communication link format.

18. The method of claim 17 further including the step of broadcasting a beacon signal via the second wireless communication link format in order to advertise the distributed wireless mobile server functions to the wireless mobile client utilizing the first wireless communication link format, wherein that client is operable in response to the beacon to associate with the wireless mobile device and terminate communications via the first wireless communication link format.

19. The method of claim 11 further including the step of coordinating with a second wireless mobile server, whereby the mobile client can communicate with fixed base stations via parallel paths.

20. The method of claim 11 further including the step of initiating handoff to a second fixed base station with communications via the mobile client, whereby the device can initiate handoff before being within direct communication range of the second fixed base station.

* * * * *

UNITED STATES PATENT AND TRADEMARK OFFICE
CERTIFICATE OF CORRECTION

PATENT NO. : 7,633,908 B1
APPLICATION NO. : 11/236130
DATED : December 15, 2009
INVENTOR(S) : Kwong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Ninth Day of November, 2010

David J. Kappos
*Director of the United States Patent and Trademark Office*